(No Model.)
L. M. DEVORE.
DAMPER.
No. 475,079. Patented May 17, 1892.
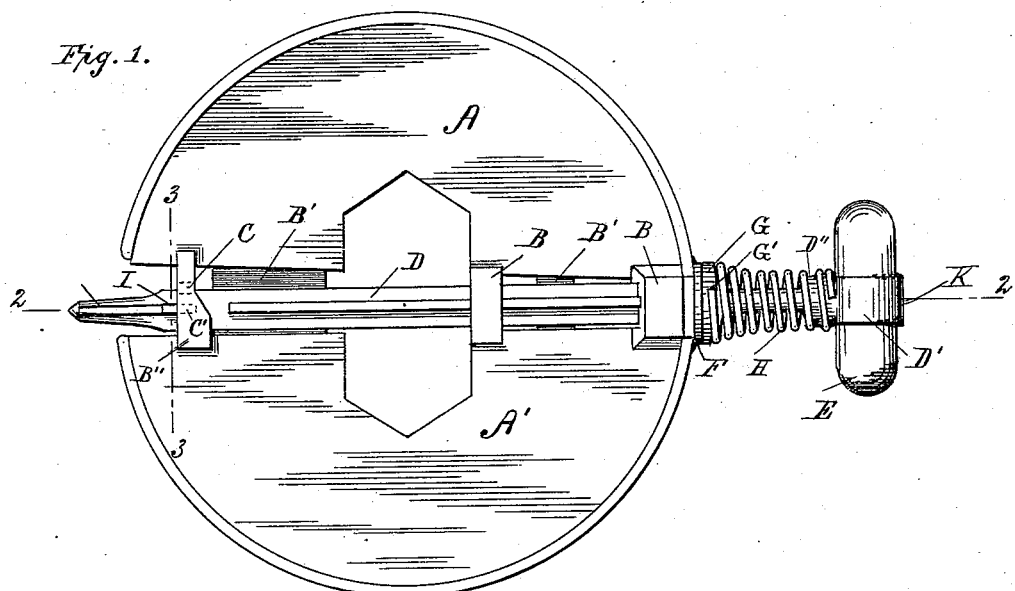
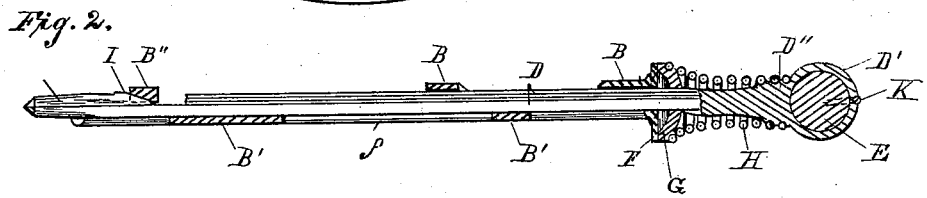
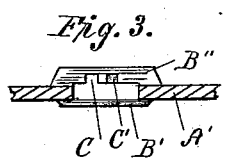
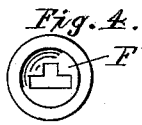
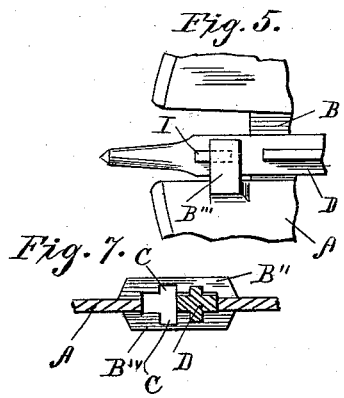
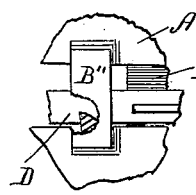
Witnesses:
Geo. H. Lamar
H. Claude
Inventor:
L. M. Devore
By Miles & Greene,
Attys.

UNITED STATES PATENT OFFICE.

LEVI M. DEVORE, OF FREEPORT, ILLINOIS, ASSIGNOR OF ONE-HALF TO MITCHELL H. WILCOXON, OF SAME PLACE.

DAMPER.

SPECIFICATION forming part of Letters Patent No. 475,079, dated May 17, 1892.

Application filed September 19, 1891. Serial No. 406,219. (No model.)

*To all whom it may concern:*

Be it known that I, LEVI M. DEVORE, a citizen of the United States, residing at Freeport, in the county of Stephenson and State of Illinois, have invented certain new and useful Improvements in Dampers; and I do declare the following to be a full, clear, and exact description of the invention, such as will enable others skilled in the art to which it appertains to make and use the same, reference being had to the accompanying drawings, and to the letters of reference marked thereon, which form a part of this specification.

In this damper the detachable spindle is secured to the plate by movement in a direction parallel to the plane of the plate. A spring coiled about the spindle near its end forces a washer against the exterior of the pipe, thus preventing accidental turning of the damper, and the arrangement is such that the same spring maintains the engagement of the spindle and plate. The object is to lessen the cost of manufacture, to secure greater convenience, and to provide forms such that even very appreciable warping of the parts by long-continued heat shall not materially affect the working of the devices.

In the drawings, Figure 1 is a plan of the damper complete. Fig. 2 is a section on the line 2 2, Fig. 1. Fig. 3 is a section on the line 3 3, Fig. 1. Fig. 4 is a plan of the washer above mentioned. Figs. 5, 6, and 7 are illustrations of modifications, hereinafter explained.

Both the spindle and the plate are provided with catches that are thrown into mutual engagement by sliding the spindle longitudinally into a channel provided for it and pressing it with force sufficient to overcome the force of a spring coiled about its outer end and then swinging it in a direction parallel to the plane of the plate until the catches pass. It is then released, when the recoil of the spring completes the engagement of the catches.

In the drawings, to which reference is had by letters, A A' are the two parts of a plane damper-plate having the usual central opening. These parts are connected by integrally-formed bridges B B', arranged upon opposite sides of the plane of the plate in such manner as to span the space between the segments A A' and with the edges of the segments to form a way for the spindle D. The spindle is non-circular in cross-section and the way is so formed that rotation of the spindle with reference to the plate is impossible. B'' is a somewhat similar bridge provided upon its inner face with a groove C and a catch or notch C', the latter being preferably diminished in depth in passing toward the center of the plate. One end of the spindle is pointed and rounded in the usual way and at the other end is an eye D', through which passes a handle-bar E, preferably of wood. The edges and outer face of the eye are grooved to receive a staple K, which is driven into the handle-bar to secure it against withdrawal in case of its shrinking. The edge of the plate has the ordinary boss F to bear against the inner face of the pipe and opposed to the boss is a washer G, that slides without rotating upon the non-cylindrical spindle. A spring H is coiled about the spindle between the washer and the eye D' and this exerts a constant pressure upon the washer when the spindle is so connected with the plate that it cannot be withdrawn by the spring's action. Near the opposite end of the spindle is a projecting catch or lug I, that when the spindle is inserted slides through grooves C in the bridges a little at one side of the plate's diameter. When it has been pushed beyond the last bridge, the spindle is swung to a diametrical position and the recoil of the spring causes the catch to engage the catch C' of the bridge. The washer G has its outer face spiral to receive the end of the coil and is provided with a shoulder G' to prevent the coil's rotation. The spindle itself is enlarged near the eye D' and spirally grooved to receive the last turns of the coil, which is screwed into position and which may be partially unscrewed if it be desired to increase the tension.

Fig. 5 shows an overhanging lug instead of a complete bridge B''.

Fig. 6 shows a projecting catch upon the bridge B'', engaging a catch formed upon the spindle by recessing it.

Fig. 7 illustrates the modification of placing opposite the bridge B'' a duplicate bridge and providing catches upon both sides of the spindie, the figure being also a section on the line 3 3 of Fig. 1 after the additional bridge has been added to the damper therein shown. When both catches are employed, there is less reason for making the spindle non-cylindrical, since the two lugs or catches are sufficient to resist any ordinary strain.

What I claim is—

1. The combination, with a damper-plate having a spindle-way formed by integral opposite bridges in planes whose separation is substantially equal to the thickness of the spindle, of a spindle narrower than the span of the bridges and adapted to slide between them and means for detachably securing the spindle to the plate to prevent its motion between the bridges, substantially as set forth.

2. The combination, with the plate consisting of segments connected by integrally-formed opposite bridges, of the non-revoluble spindle sliding closely between the bridges and having a width less than the span of the latter, both said plate and spindle being provided with suitable catches to mutually engage when the spindle is swung laterally in the proper direction, substantially as set forth.

3. The combination, with the non-cylindrical spindle and the damper-plate having a spindle-way adapted to hold the spindle against motion away from the plane of the plate while permitting its lateral movement parallel to that plane, of catches upon both plate and spindle and a spring coiled about the outer end of the spindle to draw the same longitudinally, and thus hold the catches in engagement.

4. The combination, with a damper-plate provided with a spindle-way, of a spindle sliding in said way and having near its outer end a spiral groove to receive the end turns of a coil, a spring coiled about the spindle and screwing into said groove, and a washer sliding but not rotating upon the spindle and provided with a shoulder to receive the end of the coil-wire and prevent the coil's rotation.

In testimony whereof I affix my signature in presence of two witnesses.

LEVI M. DEVORE.

Witnesses:
LEONARD STOSKOPF,
MICHAEL STOSKOPF.